United States Patent
Polensky

[11] Patent Number: 5,490,468
[45] Date of Patent: Feb. 13, 1996

[54] SAFE WITH REFACTORY LAMINATE WALLS

[75] Inventor: Donald Polensky, San Jose, Calif.

[73] Assignee: Lockheed Missiles & Space Co., Inc., Sunnyvale, Calif.

[21] Appl. No.: 169,273

[22] Filed: Dec. 20, 1993

[51] Int. Cl.[6] .................................................. E04B 2/00
[52] U.S. Cl. ........................ 109/80; 109/82; 109/84; 109/49.5; 109/76; 428/920
[58] Field of Search ..................... 109/5, 26, 49.5, 109/50, 58, 64, 65, 74, 76, 78–85; 70/417; 428/469, 472, 920, 921

[56] References Cited

U.S. PATENT DOCUMENTS

| | | | |
|---|---|---|---|
| 952,877 | 3/1910 | Cowper-Coles | 109/82 |
| 3,709,169 | 1/1973 | Gauger, Jr. et al. | 109/76 X |
| 3,765,300 | 10/1973 | Taylor et al. | 109/82 X |
| 4,179,979 | 12/1979 | Cook et al. | 109/49.5 X |
| 4,369,717 | 1/1983 | Bollier | 109/82 X |
| 4,662,288 | 5/1987 | Hastings et al. | 109/5 X |
| 4,685,402 | 8/1987 | Nelson et al. | 109/65 |
| 4,735,155 | 4/1988 | Johnson | 109/65 X |
| 4,822,657 | 4/1989 | Simpson | 109/82 X |
| 4,926,761 | 5/1990 | Haesebrouck | 109/49.5 |
| 5,030,518 | 7/1991 | Keller | 428/920 X |
| 5,060,582 | 10/1991 | Salzer | 109/49.5 |
| 5,296,288 | 3/1994 | Kourtides et al. | 428/920 X |

Primary Examiner—Steven N. Meyers
Assistant Examiner—Suzanne L. Dino
Attorney, Agent, or Firm—Feix & Feix; H. Donald Volk

[57] ABSTRACT

A safe, vault or container 10 has a laminate wall that is resistant to the cutting effects of a high-temperature torch. The wall of the safe, vault or container 10 comprises a hardened steel outer panel 21 and a hardened steel inner panel 22. A refractory abrasive layer 23, as of Carborundum, is disposed adjacent the outer panel 21 to break any drill that might penetrate through the outer panel 21. A thermally conductive layer 24 is disposed adjacent the abrasive layer 23 to conduct heat rapidly away from any localized hot spots that might develop within the abrasive layer 23 when heat from a high-temperature torch is applied to a region of the outer panel 21. A thermally insulating layer 25 is disposed between the thermally conductive layer 24 and the inner panel 22 to inhibit heat transfer from the thermally conductive layer 24 to the inner panel 22. The thermally insulating layer 25 comprises a porous ceramic material consisting of vitreously fused ceramic fibers.

1 Claim, 3 Drawing Sheets

FIG_1
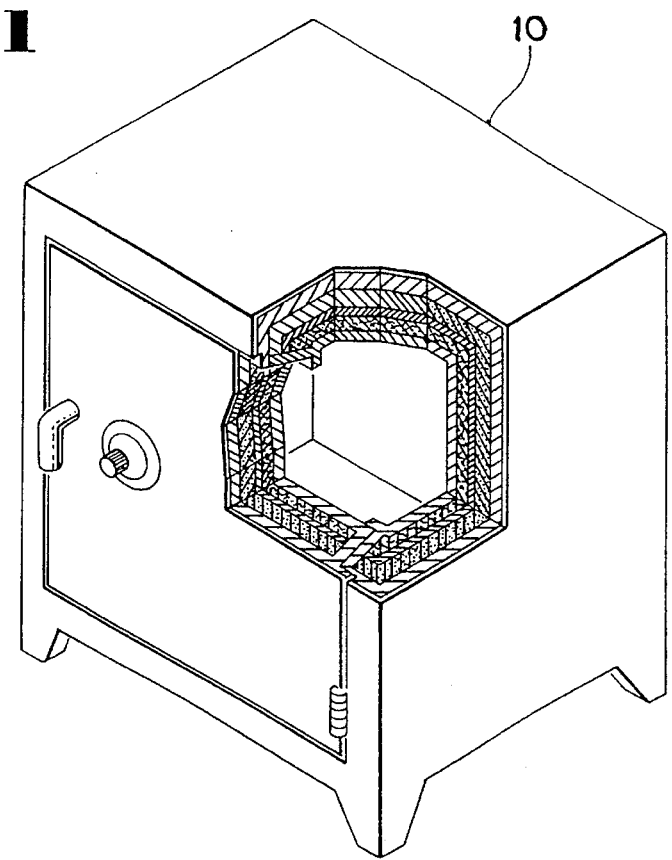
FIG_2
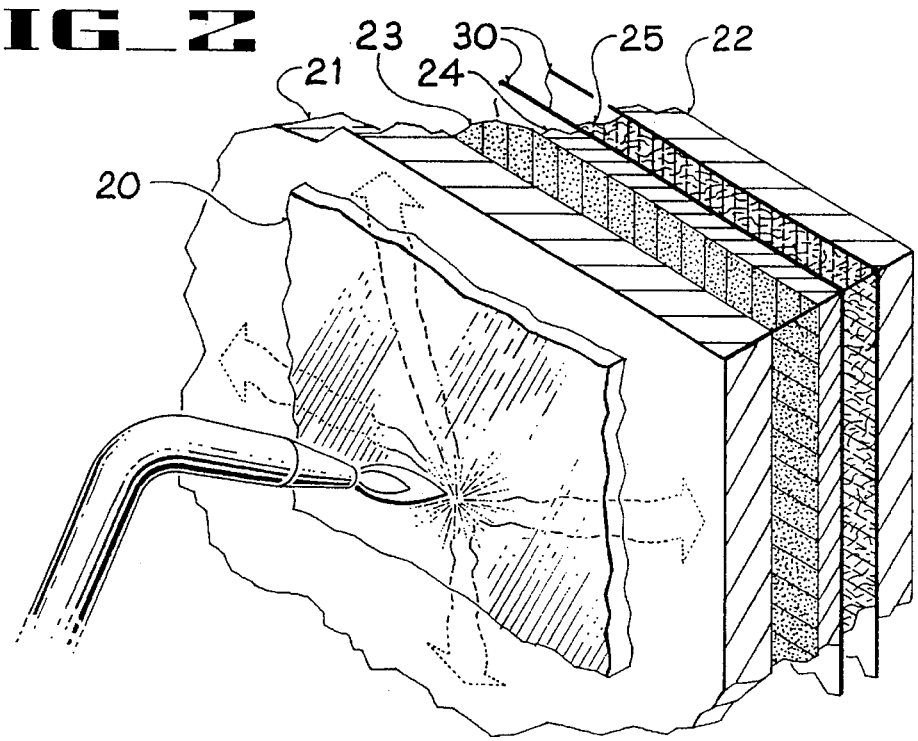

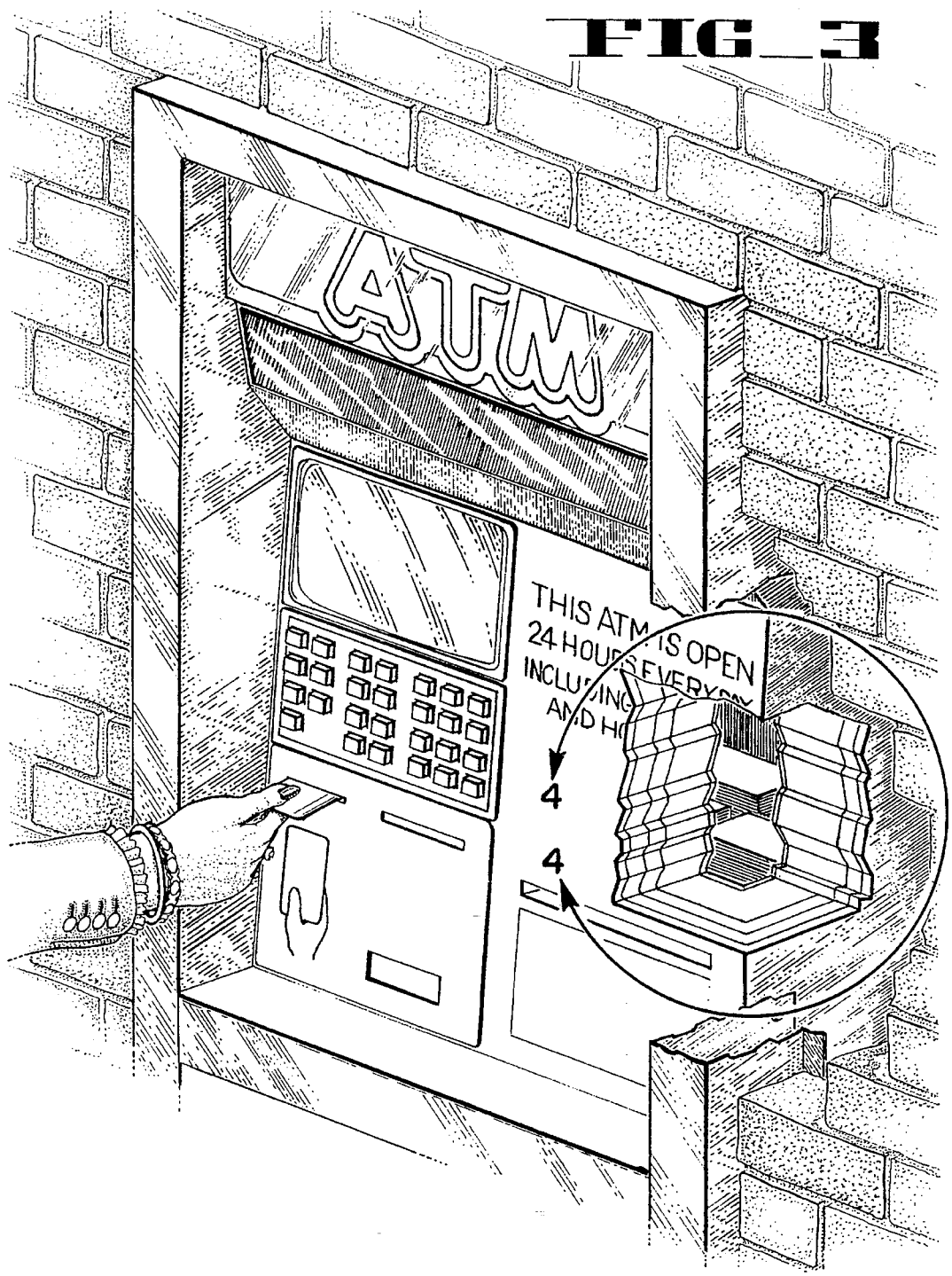

FIG_4
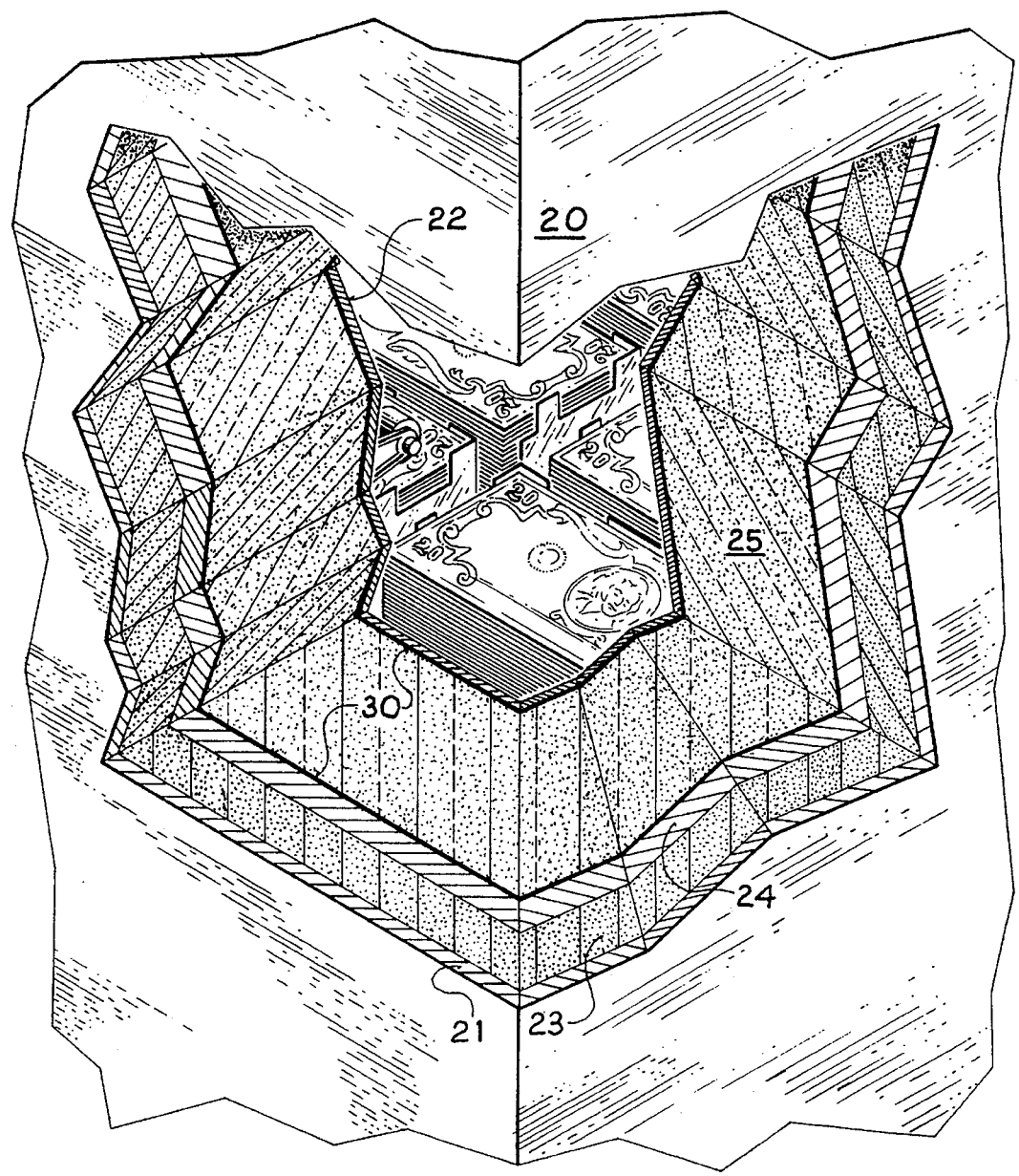

5,490,468

SAFE WITH REFRACTORY LAMINATE WALLS

TECHNICAL FIELD

This invention pertains generally to safes, vaults and the like for storing valuable items, and more particularly to a safe, vault or container with a laminate wall comprising a thermally insulating layer made of a porous ceramic refractory material that retards the cutting effects of a high-temperature torch.

BACKGROUND ART

A new generation of easily portable high-temperature cutting torches has recently been developed for use in emergency rescue operations. However, such torches have also been implicated in a number of burglaries in which safes and vaults have been cut open. A need has been perceived for an upgraded type of safe or vault that is more resistant than storage containers of the prior art to the cutting effects of high-temperature torches.

SUMMARY OF THE INVENTION

It is an object of the present invention to provide a safe, vault or container for valuable items that is more resistant than storage containers of the prior art to the cutting effects of high-temperature torches.

It is a particular object of the present invention to provided a container having a laminate wall that comprises a thermally insulating layer made of a porous ceramic material, which retards the cutting effects of a high-temperature torch. The wall has an outer panel made of metal (as of hardened steel), and an inner panel made of metal (as likewise of hardened steel). The thermally insulating layer is disposed between the outer and inner panels. As intense heat is applied by a cutting torch to an exterior surface portion of the outer panel, the contents of the safe are shielded from the intense heat of the torch by the thermally insulating layer.

The thermally insulating layer preferably comprises ceramic fibers that are fused to form a rigid structure. The thermally insulating layer can be made of HTP fibrous ceramic insulation developed by Lockheed Missiles & Space Company, Inc. of Sunnyvale, Calif., or of FRCI-12 fibrous ceramic insulation developed by NASA, for use in fabricating thermal insulation tiles for NASA's space shuttles. The HTP and FRCI-12 materials are very porous and can absorb many times their own weight of water. It is preferable that the thermally insulating layer be saturated with water to provide additional thermal protection.

In a preferred embodiment of the invention, a layer of refractory abrasive material is also provided within the wall of the safe, preferably in contact with the interior surface of the outer panel, in order to dull or otherwise ruin drills used to cut into the wall. The abrasive layer, which can also function as thermal insulation, comprises a composite containing carbide granules, which are preferably of different (i.e., coarse and fine) grain sizes. The carbide granules preferably consist of silicon carbide.

Also in the preferred embodiment, a thermally conductive layer (as of copper) is provided within the wall of the safe, preferably between the layer of refractory abrasive material and the thermally insulating layer. The thermally conductive layer has a sufficient thermal mass to conduct heat rapidly away from any localized area in the vicinity of where intense heat might be applied to the outer panel of the safe by a cutting torch.

DESCRIPTION OF THE DRAWING

FIG. 1 is a perspective view, partially broken away, of a safe having a laminate wall according to the present invention.

FIG. 2 is a cross-sectional perspective view in enlarged detail of the laminate wall of the safe shown in FIG. 1.

FIG. 3 is a perspective view, partially broken away, illustrating a particular application of the present invention as a vault for an automatic teller machine (ATM).

FIG. 4 is a perspective view, partially broken away, of a vault having a laminate wall according to the present invention.

BEST MODE OF CARRYING OUT THE INVENTION

In FIG. 1, a safe 10 is illustrated as a walled structure of generally conventional external configuration, which defines a volume within which valuable items can be securely stored. The safe 10 comprises:

a) a cavity-defining member of integral construction, which has a top portion, a bottom portion, two opposite side portions and a back portion; and b) a door member, which is hingedly attached in a conventional manner to the cavity-defining member.

The top, bottom, side and back portions of the cavity-defining member, together with the door member that is hingedly attached to the cavity-defining member, collectively comprise a wall enclosing the interior volume of the safe 10.

It is a feature of the present invention that every portion of the wall of the safe 10, or at least those portions of the wall that are accessible to a person who might attempt to cut therethrough with a high-temperature torch, are of laminate construction as described hereinafter.

FIG. 2 illustrates the laminate construction of a portion of the wall of the safe 10 in enlarged detail. The wall portion as illustrated could have an exterior metal plating 20, which would be polished (and perhaps also painted) on its outwardly facing surface in accordance with aesthetic criteria. A burglar attempting to cut open the safe 10 with a high-temperature cutting torch would apply a flame produced by the torch to a region of the plating 20 as illustrated in FIG. 2. Structural strength of the wall of the safe 10 is provided by an outer panel 21 and an inner panel 22, which are both made of a strong hard metal (typically, steel). In a less elaborately appointed embodiment, the exterior metal plating 20 would be omitted—in which case a burglar attempting to cut open the safe 10 would apply the flame of the cutting torch directly to a region of the outer panel 21.

An abrasive layer 23, which comprises a refractory matrix containing a mixture of abrasive granules, is disposed adjacent the outer panel 21. The abrasive granules could be, e.g., silicon carbide or silicon boride granules. In particular embodiments, the abrasive layer 23 could be formed of commercially marketed Carborundum material. The function of the abrasive layer 23 is to hinder or defeat the use of a drill that might be used to breach the outer panel 21. Preferably, the mixture of abrasive granules comprising the abrasive layer 23 includes granules in a range of coarse and fine sizes so as to hinder or defeat drills of various sizes. Other strategies known to the art could also be utilized to hinder or defeat the use of a drill. For example, a gap (not illustrated in FIG. 2) could be provided between the outer panel 21 and the abrasive layer 23, which would be filled with steel ball bearings that would continually fill the grooves of any drill passing therethrough—thereby greatly reducing or eliminating the cutting effect of the drill.

As also shown in FIG. 2, a thermally conductive layer 24 (as of copper) is provided adjacent the abrasive layer 23. The refractory abrasive layer 23 serves a thermally insulative function, whereby heat that is conducted through a localized region of the outer panel 21 tends to dissipate throughout the mass of the abrasive layer 23. However, if any "hot spots" develop within the abrasive layer 23, the thermally conductive layer 24 conducts heat rapidly away from such "hot spots" so as to achieve a substantially uniform heat distribution within the wall of the safe 10.

In accordance with the present invention, a thermally insulating layer 25 made of a porous ceramic material is provided between the thermally conductive layer 24 and the inner panel 22. The thermally insulating layer 25 functions to prevent or inhibit heat transfer to the inner panel 22, thereby protecting the contents of the safe 10. In the preferred embodiment, the ceramic material comprising the thermally insulating layer 25 consists of vitreously bonded ceramic fibers—e.g., silica, alumina or zirconia fibers, or a mixture of such fibers. Fluxes that promote vitreous bonding of such ceramic fibers include oxides of boron, silicon, and alkali and alkaline earth elements.

A particular commercially available porous ceramic material contemplated for the thermally insulating layer 25 is HTP ceramic insulation developed by Lockheed Missiles & Space Company, Inc. of Sunnyvale, Calif. for the thermal insulation tiles used on NASA's space shuttle orbiters. HTP ceramic insulation consists of a mixture of silica and alumina fibers obtainable from commercial vendors and "Nextel 312" fibers obtainable from 3M Company. "Nextel 312" material contains a small amount of boron, which welds the silica and alumina fibers into a rigid structure during high-temperature sintering in a furnace. Alternatively, the thermally insulating layer 25 can be made of conventional refractory brick. However, fibrous ceramic material has the advantage of providing optimal thermal protection. The thermally insulating layer 25 can be enclosed in a water-tight receptacle (e.g., a plastic sack) 30; and the fibrous ceramic material comprising the thermally insulating layer 25 contained within the receptacle 30 can be saturated with water to provide additional thermal protection.

FIG. 3 illustrates a particular application for the present invention—viz., as the vault of an automated teller machine (ATM), which is apt to be located in an area accessible to the public but distant from immediate attention by security personnel. FIG. 4 illustrates the laminate construction of the wall of such a vault in detail. The reference numbers shown in FIG. 4 correspond to the reference numbers shown in FIG. 2.

The present invention has been described above in terms of certain exemplary embodiments. However, other embodiments that would become apparent upon perusal of the foregoing description and the accompanying drawing are also within the scope of the present invention. Therefore, the legal definition of the present invention is broadly provided by the following claims and their equivalents.

I claim:

1. A container having a laminate wall constructed to be resistant to the cutting effects of high temperature torches and to the drilling effects of high speed drills, said wall comprising:

a) a hardened steel outer panel;
   b) a hardened steel inner panel;
   c) a refractory abrasive layer disposed immediately adjacent the hardened steel outer panel;
      said refractive abrasive layer comprising a composite containing silicon carbide granules of a coarse size and silicon carbide granules of a fine size for hindering drills of various sizes,
   d) a thermally insulating porous ceramic layer of vitreously bonded ceramic fibers and having interstitial spaces between the ceramic fibers, said thermally insulating porous ceramic layer being disposed immediately adjacent the hardened steel inner panel, said thermally insulating porous ceramic layer consisting of vitreously bonded ceramic fibers made of a mixture of materials selected from the group consisting of silica, alumina, and zirconia, said thermally insulating porous ceramic layer functioning to retard heat transfer from said hardened steel outer panel to said hardened steel inner panel,
      said ceramic fibers being vitreously bonded by a flux selected from the group consisting of oxides of boron, silicon, and alkali and alkaline earth elements,
   e) a substantially water-tight receptacle enclosing said thermally insulating porous ceramic layer,
   f) water occupying the interstitial spaces between the ceramic fibers and contained within the substantially water tight receptacle for providing additional thermal protection, and
   g) a thermally conductive layer of copper disposed between the refractory abrasive layer and the thermally insulating porous ceramic layer and having a thermal mass sufficient to inhibit melting of said inner hardened steel panel when heat is applied by a high-temperature torch to said outer hardened steel panel.

\* \* \* \* \*